(12) United States Patent
Garrison, III

(10) Patent No.: US 12,410,045 B2
(45) Date of Patent: Sep. 9, 2025

(54) SYSTEMS AND METHODS FOR EVALUATION OF VEHICLE PARAMETERS OF A REMOTELY CONTROLLABLE MATERIAL HANDLING VEHICLE

(71) Applicant: The Raymond Corporation, Greene, NY (US)

(72) Inventor: Theodore C. Garrison, III, Greene, NY (US)

(73) Assignee: The Raymond Corporation, Greene, NY (US)

( * ) Notice: Subject to any disclaimer, the term of this patent is extended or adjusted under 35 U.S.C. 154(b) by 857 days.

(21) Appl. No.: 17/193,762

(22) Filed: Mar. 5, 2021

(65) Prior Publication Data

US 2021/0276844 A1    Sep. 9, 2021

Related U.S. Application Data

(60) Provisional application No. 62/986,299, filed on Mar. 6, 2020.

(51) Int. Cl.
*B66F 9/075*    (2006.01)
*G05D 1/00*    (2006.01)
*G07C 5/08*    (2006.01)

(52) U.S. Cl.
CPC ....... *B66F 9/07581* (2013.01); *G05D 1/0061* (2013.01); *G05D 1/0223* (2013.01); *G07C 5/0808* (2013.01)

(58) Field of Classification Search
CPC .............. B66F 9/07581; G05D 1/0061; G05D 1/0223; G05D 2201/0216; G07C 5/0808
See application file for complete search history.

(56) References Cited

U.S. PATENT DOCUMENTS 5,938,710 A    8/1999 Lanza
6,606,550 B1 *    8/2003 Ries-Mueller .......... F02D 41/22
                                                          701/115

(Continued)

FOREIGN PATENT DOCUMENTS

EP        3382668 A1    10/2018
JP        H05241651 A    9/1993
WO    WO09117069 A1 *    11/1991

OTHER PUBLICATIONS

Translation of WO09117069A1 (Year: 1991).*
European Patent Office, Extended Search Report, Application No. 21161049.8, Jul. 20, 2021, 10 pages.

*Primary Examiner* — Yuen Wong
(74) *Attorney, Agent, or Firm* — Quarles & Brady LLP

(57) ABSTRACT

A system for a remotely controllable material handling vehicle switchable between a manual mode and a travel request mode is provided. The system can include a controller including a processor and a memory, where vehicle condition data previously evaluated by the controller can be stored in the memory. A remote control device can be in communication with the controller, where a travel control function on the remote control device can be configured to provide a travel request to the controller to cause the material handling vehicle to move forward when the material handling vehicle is in the travel request mode. In some aspects, the controller can be configured to receive the travel request, recall at least one previously evaluated vehicle condition data stored in the memory, and, based on the at least one vehicle condition data stored in the memory, command the material handling vehicle to move forward.

20 Claims, 6 Drawing Sheets

(56) References Cited

U.S. PATENT DOCUMENTS

| | | | |
|---|---|---|---|
| 2006/0020382 A1* | 1/2006 | Shin | B62D 7/159 |
| | | | 180/443 |
| 2008/0071429 A1* | 3/2008 | Kraimer | G08C 17/02 |
| | | | 701/2 |
| 2009/0076664 A1* | 3/2009 | McCabe | G05D 1/0033 |
| | | | 701/2 |
| 2011/0118903 A1* | 5/2011 | Kraimer | G05D 1/0016 |
| | | | 701/2 |
| 2012/0239238 A1* | 9/2012 | Harvey | G05D 1/0236 |
| | | | 701/25 |
| 2015/0006130 A1* | 1/2015 | Tsai | G06F 30/15 |
| | | | 703/2 |
| 2020/0122989 A1 | 4/2020 | Nunes Espirito Santo | |
| 2020/0133265 A1 | 4/2020 | Modolo | |
| 2020/0135033 A1* | 4/2020 | Switkes | G08G 1/22 |
| 2020/0247652 A1 | 8/2020 | Okamoto | |
| 2020/0319643 A1 | 10/2020 | Paterson, Jr. | |
| 2021/0064026 A1 | 3/2021 | Simon et al. | |
| 2021/0247770 A1 | 8/2021 | Theos et al. | |
| 2021/0261192 A1 | 8/2021 | Theos et al. | |
| 2021/0261391 A1 | 8/2021 | Theos et al. | |
| 2021/0261392 A1 | 8/2021 | Theos et al. | |
| 2021/0292145 A1 | 9/2021 | Theos et al. | |
| 2021/0292146 A1 | 9/2021 | Theos et al. | |

\* cited by examiner

SYSTEMS AND METHODS FOR EVALUATION OF VEHICLE PARAMETERS OF A REMOTELY CONTROLLABLE MATERIAL HANDLING VEHICLE

CROSS-REFERENCES TO RELATED APPLICATIONS

This application is based on and claims the priority to U.S. Provisional Patent Application No. 62/986,299, filed on Mar. 6, 2020, and entitled "Systems and Methods for Evaluation of Vehicle Parameters of a Remotely Controllable Material Handling Vehicle."

STATEMENT REGARDING FEDERALLY SPONSORED RESEARCH

Not Applicable.

BACKGROUND

Warehouses typically employ the use of material handling vehicles, specifically, operators may use a remote control device to control travel of a material handling vehicle within the warehouse.

BRIEF SUMMARY

The present disclosure relates generally to material handling vehicles and, more specifically, to remotely controllable material handling vehicles that can be switched between a manual operation mode and a travel request mode.

According to some aspects of the present disclosure, a system for a remotely controllable material handling vehicle switchable between a manual mode and a travel request mode is provided. The system can include a controller including a processor and a memory, where vehicle condition data previously evaluated by the controller can be stored in the memory. In some aspects, a remote control device can be in communication with the controller, where a travel control function on the remote control device can be configured to provide a travel request to the controller to cause the material handling vehicle to move forward when the material handling vehicle is in the travel request mode. In some aspects, the controller can be configured to receive the travel request, recall at least one previously evaluated vehicle condition data stored in the memory, and, based on the at least one vehicle condition data stored in the memory, command the material handling vehicle to move forward.

According to some aspects of the present disclosure, a system for a remotely controllable material handling vehicle is provided. The material handling vehicle is operable in a manual mode where an operator can maneuver the material handling vehicle normally and a travel request mode where the operator can remotely request the material handling vehicle to move forward. The system includes a controller including a processor and a memory and a remote control device in communication with the controller. The controller is configured to continuously receive vehicle condition data to be stored in the memory, receive a travel request from the remote control device, recall stored vehicle condition data from the memory, and based on the stored vehicle condition data, command the material handling vehicle to move forward.

According to some aspects of the present disclosure, a method for remotely operating a material handling vehicle in a travel request mode is provided. The method can include receiving a travel request from a remote control device in communication with the material handling vehicle, recalling at least one previously evaluated vehicle condition to determine if the at least one vehicle condition is appropriate for moving the material handling vehicle forward, and, upon the determination that the at least one vehicle condition is appropriate, commanding the material handling vehicle to move forward.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Figure 1:
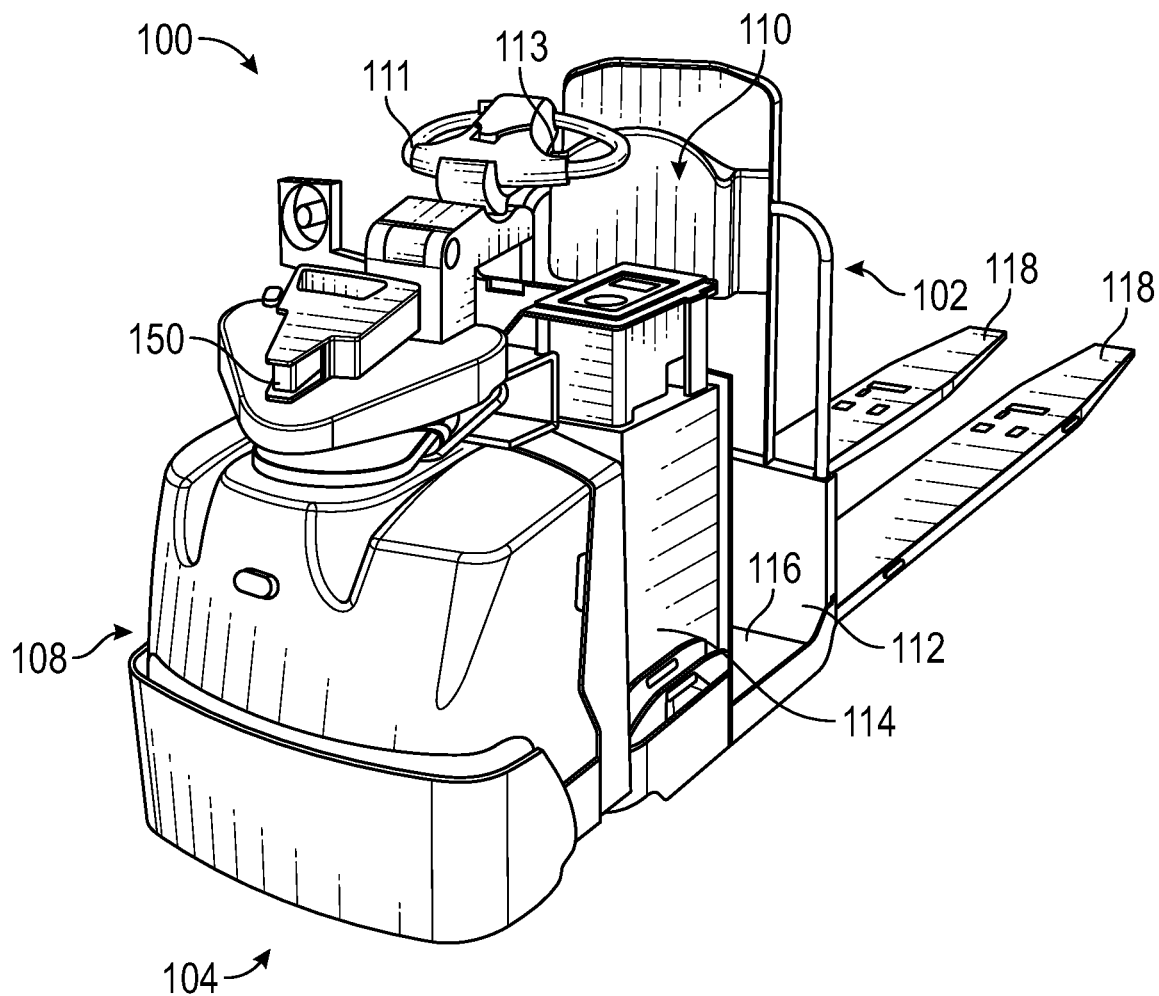
FIG. 1 is a top, front, left isometric view of a non-limiting example of a material handling vehicle according to aspects of the present disclosure.

Before any aspect of the present disclosure are explained in detail, it is to be understood that the present disclosure is not limited in its application to the details of construction and the arrangement of components set forth in the following description or illustrated in the following drawings. The present disclosure is capable of other configurations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

It is also to be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner.

The following discussion is presented to enable a person skilled in the art to make and use aspects of the present disclosure. Various modifications to the illustrated configurations will be readily apparent to those skilled in the art, and the generic principles herein can be applied to other configurations and applications without departing from aspects of the present disclosure. Thus, aspects of the present disclosure are not intended to be limited to configurations shown, but are to be accorded the widest scope consistent with the principles and features disclosed herein. The following detailed description is to be read with reference to the figures, in which like elements in different figures have like reference numerals. The figures, which are not necessarily to scale, depict selected configurations and are not intended to limit the scope of the present disclosure. Skilled artisans will recognize the non-limiting examples provided herein have many useful alternatives and fall within the scope of the present disclosure.

It is to be appreciated that material handling vehicles are designed in a variety of configurations to perform a variety of tasks. The various configurations of material handling vehicles described herein are shown by way of example. It will be apparent to those of skill in the art that the present invention is not limited to vehicles of these types, and can also be provided in various other types of material handling vehicle configurations, including for example, order pickers, reach vehicles, counterbalanced vehicles, and any other material handling vehicles. The various aspects disclosed herein are suitable for all of driver controlled, pedestrian controlled, remotely controlled, and autonomously controlled material handling vehicles.

Figure 2:
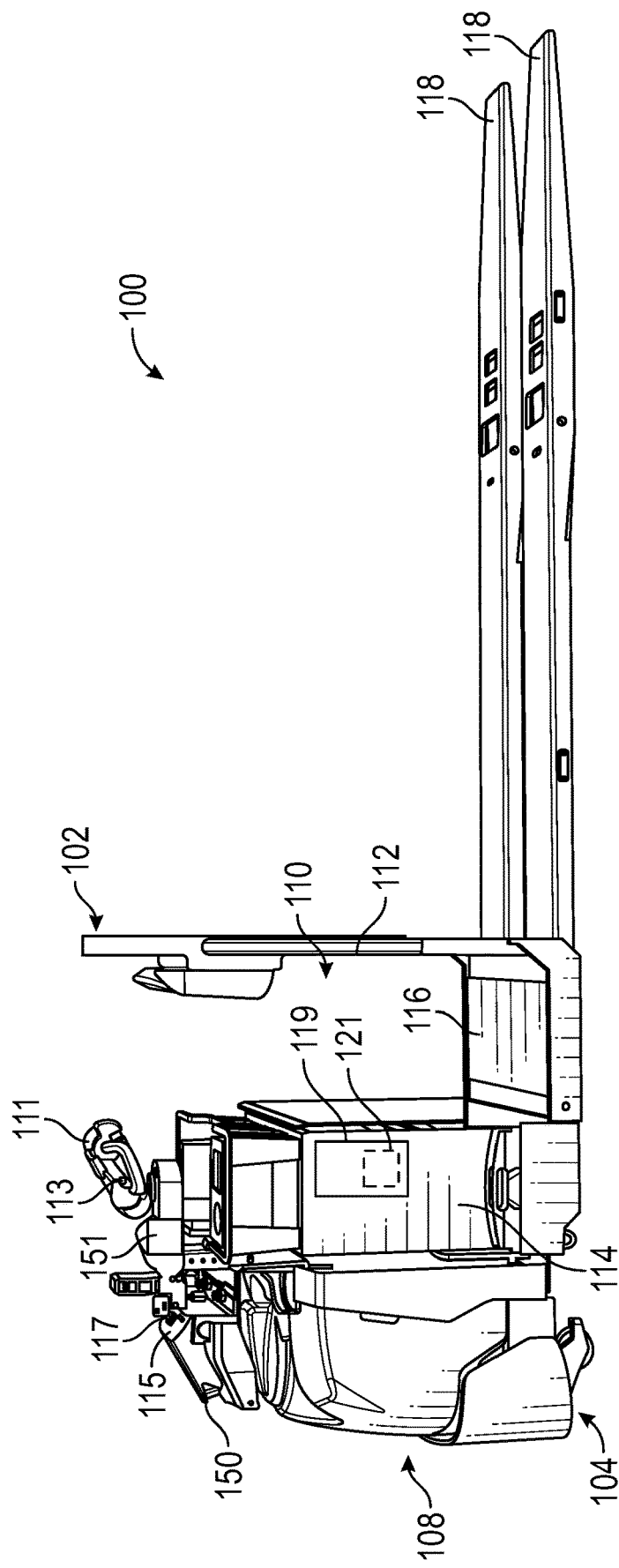
FIG. 2 is a top, left side view of the material handling vehicle of FIG. 1.

FIGS. 1 and 2 illustrate one non-limiting example of a material handling vehicle 100 ("MHV") according to the present disclosure. The material handling vehicle 100 may include a vehicle frame 102, a traction wheel 104, a power section 108, and an operator compartment 110. The power section 108 may be disposed within the vehicle frame 102 and may include a battery (not shown) configured to supply power to various components of the material handling vehicle 100. For example, the battery may supply power to a motor (not shown) and/or transmission (not shown) disposed within the power section 108 and configured to drive the traction wheel 104. In the illustrated non-limiting example, the traction wheel 104 is arranged under the power section 108. In other non-limiting examples, the traction wheel 104 may be arranged in another location under the vehicle frame 102.

The operator compartment 110 may include a control handle 111 configured to provide a user interface for an operator and to allow the operator to control a speed and direction of travel of the material handling vehicle 100. In some non-limiting examples, the control handle 111 may be configured to manually steer and control power to the traction wheel 104.

In the illustrated non-limiting example shown in FIGS. 1 and 2, the material handling vehicle 100 includes the operator compartment 110 arranged rearward of the power section 108 and having an operator opening 112 that opens towards lateral sides 114 of the material handling vehicle 100. The operator compartment 110 may also contain a floor mat 116 on which an operator of the material handling vehicle 100 may stand. In some non-limiting examples, the material handling vehicle 100 may be designed with the operator compartment arranged differently, for example, with an operator opening 112 that opens rearwardly. In the illustrated non-limiting example, the material handling vehicle 100 includes a pair of forks 118 that can be raised or lowered via actuators (not shown) in response to commands from the control handle 111.

In the illustrated non-limiting example shown in FIG. 2, the material handling vehicle 100 may also include a holster 119. The holster 119 can, for example, be attached to a portion of the material handling vehicle 100. In the illustrated non-limiting example, the holster 119 is attached to a lateral side 114 of the material handling vehicle 100. The holster 119 can be configured to temporarily hold or store a remote control device 122 when the remote control device 122 is not being held by the operator. In some embodiments, the holster 119 can include an integrated charger 121 for the remote control device 122 such that the remote control device 122 can be charged while being stored in the holster 119. In some non-limiting examples, when an operator places the remote control device 122 in the holster 119, the remote control device 122 can be unpaired from the material handling vehicle 100.

Figure 3:
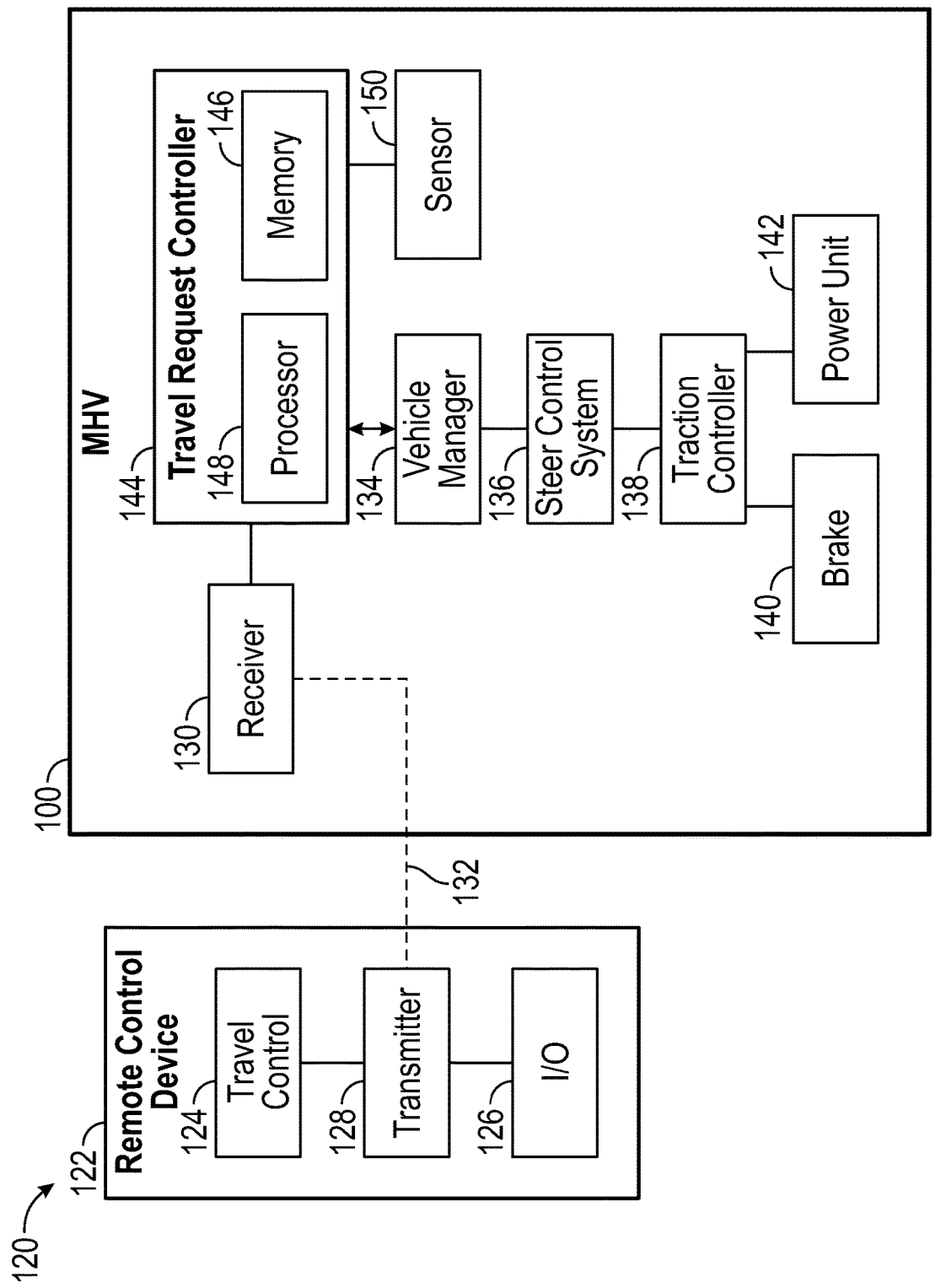
FIG. 3 is a schematic illustration of a system for a remotely controllable material handling vehicle according to aspects of the present disclosure.
Figure 7:
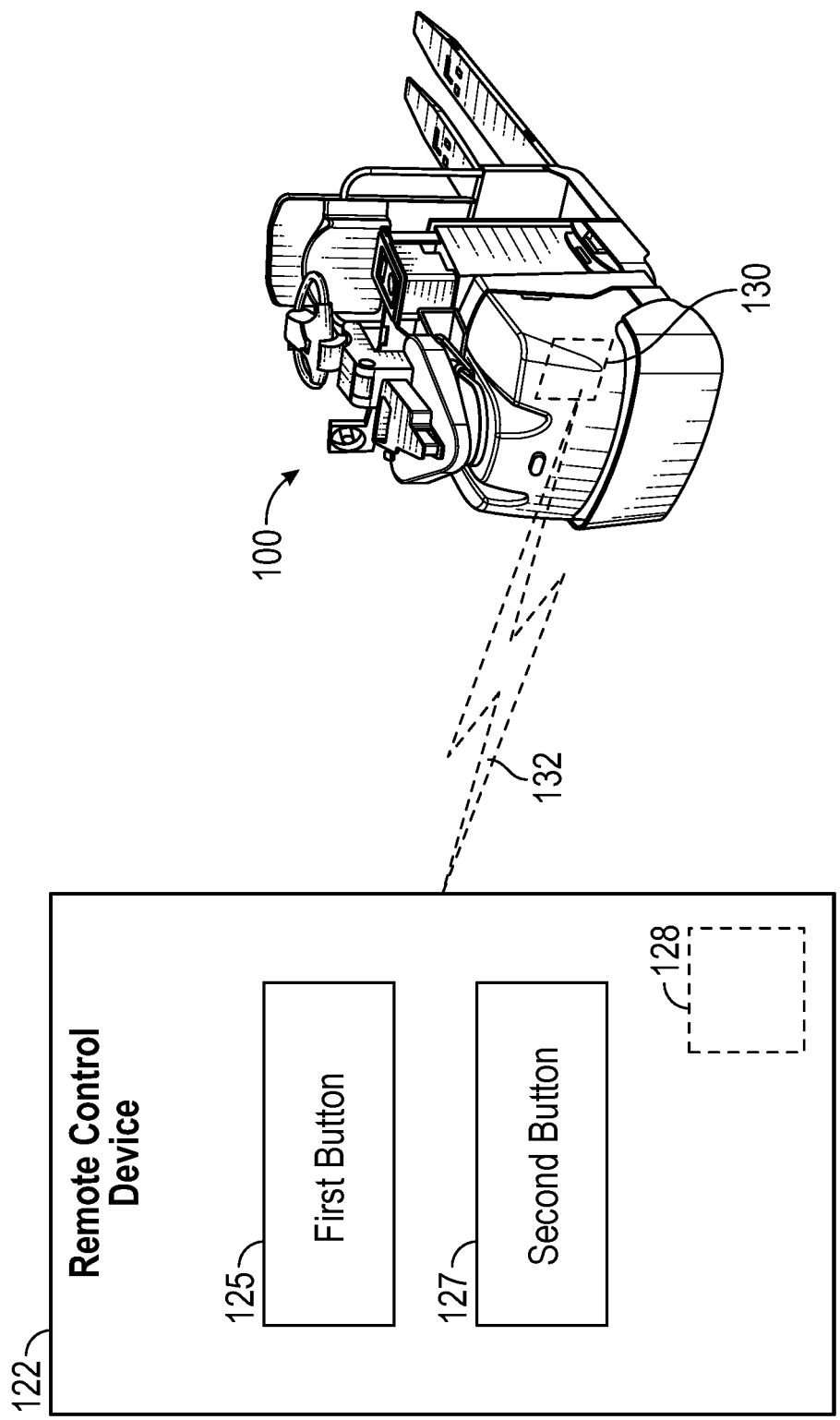
FIG. 7 is an exemplary illustration of an operator-controlled remote control device in communication with the material handling vehicle of FIG. 1.

FIG. 3 illustrates one non-limiting example of a system 120 for a remotely controllable material handling vehicle, which may be implemented, for example, in the material handling vehicle 100 shown in FIG. 1. The system 120 includes a remote control device 122 in communication with the material handling vehicle 100. The remote control device 122 is operable by an operator of the material handling vehicle 100 and can include a travel control function 124 and an I/O function 126. The travel control function 124 and the I/O function 126 can be configured as first and second manually operable functions that can be operated by, for example, a button or a switch located on the remote control device 122. For example, the travel control function 124 can be operated by a first button 125 on the remote control device 122 and the I/O function 126 can be operated by a second button 127 on the remote control device 122 (see FIG. 7). The travel control function 124 and the I/O function 126 can be in electrical communication with a transmitter 128 within the remote control device 122. The transmitter 128 on the remote control device 122 can wirelessly communicate with the material handling vehicle 100 via a receiver 130 located on the material handling vehicle 100, as represented by dashed line 132. In some non-limiting examples, the remote control device 122 may turn off after several minutes of inactivity.

As will be described herein, the travel control function 124 can be configured to send a first signal from the transmitter 128 to the receiver 130 located on the material handling vehicle 100. The first signal can be configured to instruct the material handling vehicle 100 to move forward from one location to the next within a warehouse while the operator is operating the travel control function 124 on the remote control device 122. For example, the operator may desire the material handling vehicle 100 to move in an aisle along a rack within a warehouse from one picking location to the next picking location without the operator frequently entering/exiting the operator compartment 110 on the material handling vehicle 100. Instead, the operator can operate the travel control function 124 on the remote control device 122 from outside the operator compartment 110 to move the material handling vehicle 100. That is, the travel control function 124, when actuated by the operator, provides a request to the material handling vehicle 100 to move forward. In some non-limiting examples, a duration of the forward movement of the material handling vehicle can be controllable by maintaining the travel control function 124 in an actuated state. For example, the operator can control the duration of time the material handling vehicle 100 is moving by depressing and holding the travel control function 124. In some non-limiting examples, releasing the travel control function 124 after the travel control function 124 has been held can cause the material handling vehicle 100 to stop moving forward and/or coast to a stop.

In some non-limiting examples, there may be a limited time duration on the holding of the travel request function 124 (e.g., after ten seconds, or more or less than ten seconds), after which travel of the material handling vehicle 100 may stop. In this specific non-limiting example, if the operator needs to "reset" this limited time duration, a rapid "release-and-re-hold" (e.g., within 2.5 seconds, or more or less than 2.5 seconds) of the travel request function 124 can "reset" the limited time duration without the material handling vehicle 100 coming to a stop.

The I/O function 126 can be configured to send a second signal from the transmitter 128 to a receiver 130 located on the material handling vehicle 100. In some non-limiting examples, the second signal may cause a series of events to occur, such as unpairing the remote control device 122 from the material handling vehicle 100 and stopping the material handling vehicle 100 from moving forward. For example, the I/O function 126, when actuated by the operator, unpairs the remote control device 122 from the material handling vehicle 100.

The material handling vehicle 100 can also include a vehicle manager 134 ("VM"). In the illustrated non-limiting example, the vehicle manager can be in electrical communication with a steering control system 136 and a traction controller 138. The vehicle manager 134 can be configured to issue commands and control the steering control system 136. For example, the vehicle manager 134 can send a signal to the steering control system 136 to perform a steering maneuver or issue steering commands. The steering control system 136 may then perform the issued steering commands based on the received signal. The vehicle manager 134 can be configured to issue commands and control the traction controller 138. For example, the vehicle manager 134 can send a signal to the traction controller 138 to move, position, accelerate, slow, or otherwise change a speed of the material handling vehicle 100. The traction controller 138 may then communicate (e.g., via electrical communication) to a brake 140 or a power unit 142 to change the speed of the material handling vehicle. In addition, the vehicle manager 134 can be configured to evaluate vehicle condition data from the steer control system 136 and the traction controller 138. In one non-limiting example, the steer control system 136 can sense (e.g., via a sensor) a steering angle of the material handling vehicle 100. In another non-limiting example, the traction controller 138 can sense a speed (e.g., via a sensor) of the material handling vehicle 100. In either case, the sensed steering angle or speed of the material handling vehicle 100 can be communicated to the vehicle manager 134.

Referring still to FIG. 3, the material handling vehicle 100 may also include a travel request controller 144 ("TRC"). The travel request controller 144 can have a memory 146 and a processor 148. The memory 146 can be configured to store a plurality of executable instructions that may be carried out by the processor 148. In addition, as will be described herein, the processor 148 can execute a continuous evaluation loop to continuously evaluate and store, for example, vehicle condition data of the material handling vehicle 100 in the memory 146. The processor 148 can be configured to interpret and perform calculations using the vehicle condition data stored on the memory 146.

The travel request controller 144 can be in electrical communication with the receiver 130 such that the receiver 130 can receive the first and second signals from the transmitter 128 on the remote control device 122 and transmit the first and second signals to the travel request controller 144 to interpret them. As will be described herein, the travel request controller 144 can also be in electrical communication with the vehicle manager 134 such that signals, commands, and vehicle data can be sent or communicated between the travel request controller 144 and the vehicle manager 134. For example, the travel request controller 144 can continuously (e.g., about every 20 milliseconds, or more or less) communicate vehicle command information to the vehicle manager 134. In one non-limiting example, the vehicle command information can be transmitted from the travel request controller 144 to the vehicle manager 134 via a process data object ("PDO") message. The vehicle command information continuously being delivered from the travel request controller 144 can include travel commands (e.g., a request for forward vehicle motion), fork 118 raising or lowering commands, horn activation commands, stop commands, and control mode requests (e.g., a request to transition to/from a manual mode or a travel request mode). In addition, when the material handling vehicle 100 is in a travel request mode, the travel request controller 144 may send a steering command to the vehicle manager 134, or the travel request controller 144 can set a maximum vehicle speed limitation or acceleration limitation through the vehicle manager 134 (e.g., limiting the maximum speed of the material handling vehicle to a walking speed during remote operation, etc.).

The material handling vehicle 100 can also have a sensor 150 (e.g., positioned at a front of the vehicle, see FIGS. 1-2). In one non-limiting example, the sensor 150 can be a time-of-flight camera or a 2D or 3D LIDAR scanner, however other obstacle detection capable sensors are also envisioned, such as any other obstacle detection sensor known in the art. The sensor 150 can be in electrical communication with the travel request controller 144 and can be configured to sense or detect obstacles located in or near a travel path of the vehicle. In one non-limiting example, the sensor 150 may also be configured to detect a rack located along a lateral side 114 of the material handling vehicle 100.

Referring now to FIGS. 1-3, the material handling vehicle 100 can be configured to transition between a manual mode and a travel request mode. In one non-limiting example, the material handling vehicle 100 can have a switch 151 (e.g., a manually operable switch, see FIG. 2) that can be positioned within or near the operator compartment 110 for access by the operator of the material handling vehicle 100. For example, the switch can be positioned on the control handle 111, next to a display 115, or on a control panel 117 and accessible by the operator. In another non-limiting example, the switch can be positioned on the outside of the material handling vehicle 100. For example, the switch can be positioned on one or both of the lateral sides 114 or on the vehicle frame 102 of the material handling vehicle 100. In another non-limiting example, the transition between a manual mode and a travel request mode can be initiated by the travel request controller 144 upon a pairing of the remote control device 122 to the material handling vehicle 100, or upon activating the travel control function 124.

Now that the components of the system 120 have been described, operation of the remotely controlled material handling vehicle 100 will be described in the paragraphs to follow with reference to FIGS. 1-3. When the material handling vehicle 100 is in manual mode, the material handling vehicle 100 can be operated normally by the operator. For example, the operator can use the control handle 111 on the material handling vehicle 100 to accelerate, decelerate, steer, or otherwise maneuver the material handling vehicle 100 manually by using a throttle or brake button/lever located on the control handle 111. In one non-limiting example, the control handle 111 may include one or more jog buttons 113 configured to, when engaged, cause the material handling vehicle 100 to travel at a walking speed. Upon release of the jog button 113, the material handling vehicle 100 may coast to a stop.

The remote control device 122 can be paired, unpaired, or otherwise connected/disconnected to the material handling vehicle 100 when the material handling vehicle 100 is in the manual mode. However, travel or I/O commands (e.g., the first and second signals, respectively) generated by the remote control device 122 may not be executed by travel request controller 144 or communicated to the vehicle manager 134. For example, when the material handling vehicle 100 is in the manual mode, the operator is unable to maneuver the material handling vehicle 100 using the remote control device 122. According to some embodiments, I/O commands delivered by the remote control device 122 may still be sent to the travel request controller 144 to unpair the remote control device 122.

Conversely, when the material handling vehicle 100 is in the travel request mode, travel or I/O signals (e.g., the first and second signals, respectively) generated by the remote control device 122 are communicated to the vehicle manager 134 via the travel request controller 144. For example, when the material handling vehicle 100 is in the travel request mode, the operator can cause the material handling vehicle 100 to move forward using the travel control function 124 and can cause the material handling vehicle 100 to unpair from the remote control device 122 using the I/O function 126 on the remote control device 122. Additionally, when the material handling vehicle 100 is in the travel request mode, the operator is unable to maneuver the material handling vehicle 100 using the control handle 111. For example, steering or throttle inputs, including inputs from the jog buttons 113, from the control handle 111 may not be communicated to, or ignored by, the vehicle manager 134. For example, the throttle on the control handle 111 can be prevented from controlling the speed of the material handling vehicle 100. In some embodiments, the jog buttons 113 may remain functional. For example, when the material handling vehicle 100 is in the travel request mode position, and the remote control device 122 is yet to be paired, the jog buttons 113 may remain functional. If a remote control device 122 is then paired to the material handling vehicle 100, the jog buttons 113 may no longer be functional. In some non-limiting examples, a horn button (not shown) may be located on the control handle 111, and the horn button may remain active and usable by the operator when the material handling vehicle 100 is in either of the manual mode or the travel request mode. The operator may also be unable to manipulate the forks 118 using the control handle 111 when the material handling vehicle 100 is in the travel request mode. For example, when the remote control device 122 is paired with the material handling vehicle 100, the forks 118 may not be maneuverable (e.g., raised or lowered) by the operator.

Figure 4:
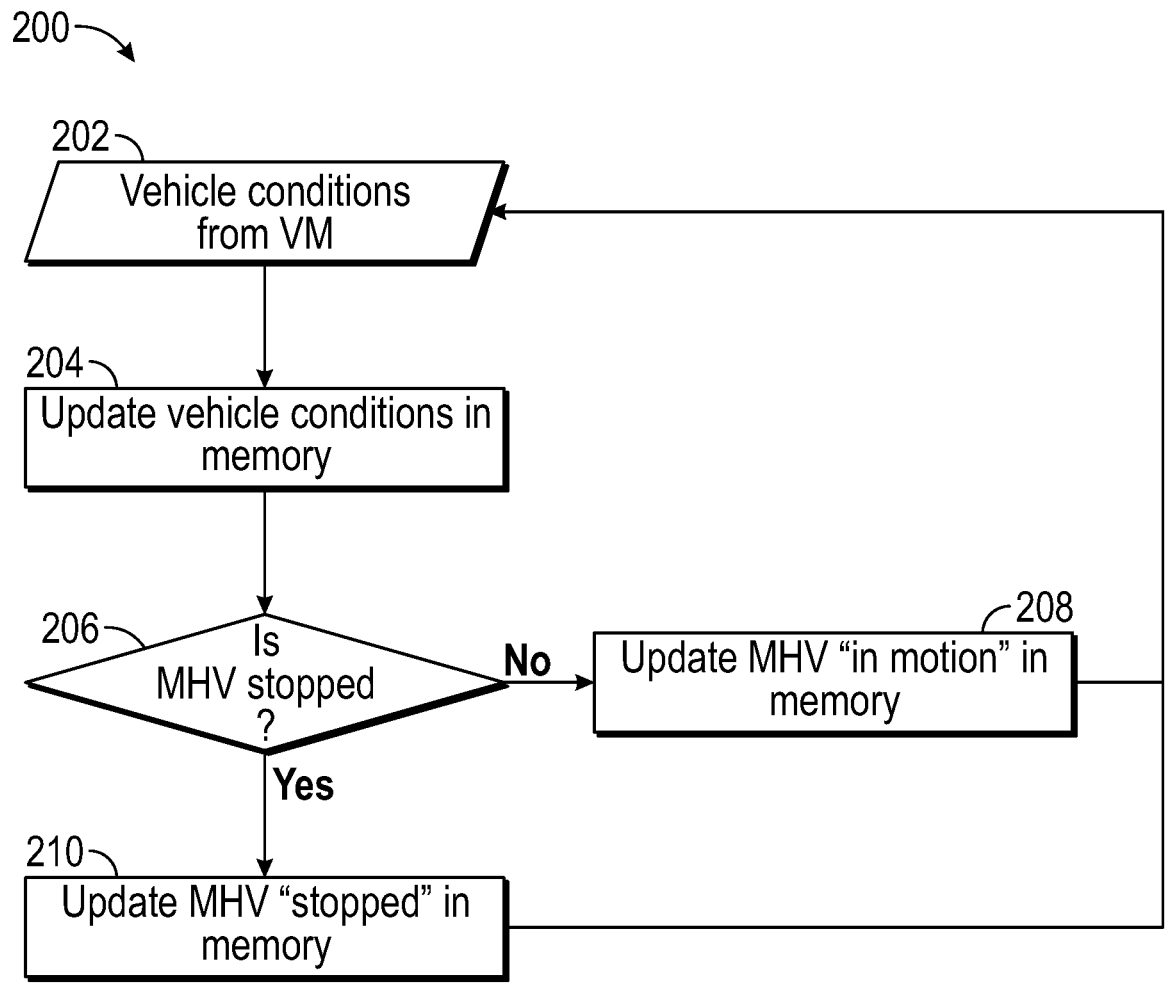
FIG. 4 is a schematic illustration of a continuous evaluation loop according to aspects of the present disclosure.

Referring now to FIG. 4, an exemplary schematic of the continuous evaluation loop 200 is illustrated. As previously described herein, the continuous evaluation loop 200 may be executed continuously, for example, by processor 148, at predetermined discrete time intervals (e.g., about every 20 milliseconds to about every 1 second, or more than 1 second or less than 20 milliseconds) while the material handling vehicle 100 is in operation (e.g., while the material handling vehicle 100 is "ON", irrespective of the mode the vehicle is in). The continuous evaluation loop 200 can start when the travel request controller 144 receives vehicle condition data from the vehicle manager 134, as illustrated by input block 202. In one non-limiting example, the vehicle condition data can be communicated from the vehicle manager 134 to the travel request controller 144 via a process data object. In one non-limiting example, the vehicle condition data can include one or both of the steering angle and the vehicle speed of the material handling vehicle 100. For example, the steer control system 136 can sense the steering angle of the material handling vehicle 100 and the traction controller 138 can sense the speed of the material handling vehicle 100. The sensed steering angle and speed of the material handling vehicle 100 can be communicated to the vehicle manager 134, and the vehicle manager 134 can then communicate the vehicle condition data to the travel request controller 144.

In another non-limiting example, the vehicle condition data communicated from the vehicle manager 134 to the travel request controller 144 can further include the current mode the material handling vehicle 100 is operating in (e.g., either the manual mode or the travel request mode). In another non-limiting example, the vehicle condition data can further include brake application status. For example, the vehicle manager 134 can communicate through the traction controller 138 to determine a status of the brake 140, and communicate that status to the travel request controller 144.

At step 204, the travel request controller 144 can store the vehicle condition data (e.g., steering angle, vehicle speed, etc.) on the memory 146 in the travel request controller 144. At step 206, the travel request controller 144 may then determine a vehicle condition, such as a motion condition, of the material handling vehicle. For example, the travel request controller 144 can determine if the material handling vehicle 100 is stopped. For example, the travel request controller 144 may use the vehicle speed received from the vehicle manager 134 or the vehicle speed stored in the memory 146 and compare the vehicle speed to a threshold value defined for a stopped vehicle (e.g., approximately 0 mph) to determine the motion condition of the material handling vehicle 100. In one non-limiting example, the threshold value can be zero mph. If the travel request controller 144 determines that the vehicle speed is greater than the threshold value, then the travel request controller 144 stores (e.g., in the memory 146) that the material handling vehicle 100 is "IN MOTION" (or some other representative designation that may indicate that the vehicle is not stopped), as indicated by step 208. Conversely, if the travel request controller 144 determines that the vehicle speed is at or less than the threshold value, then the travel request controller 144 stores that the material handling vehicle 100 is "STOPPED" (or some other representative designation that may indicate that the vehicle is stopped), as indicated by step 210.

As previously noted, the continuous evaluation loop 200 may run continuously at discrete time intervals, which can enable, for example, the memory 146 of the travel request controller 144 to have recent and accurate vehicle condition data stored on the memory 146. In one non-limiting example, the continuous evaluation loop 200 can be executed by the travel request controller 144 about every 20 milliseconds. In another non-limiting example, the continuous evaluation loop 200 can be executed about every second, any time period between 20 milliseconds and one second, or any time period more than 1 second or less than 20 milliseconds. One of ordinary skill in the art readily recognizes that the specific time period chosen can be application specific and is not intended to be limiting in any way.

As will be described in greater detail in the paragraphs to follow, the travel request controller 144 can execute the continuous evaluation loop 200 such that the travel request controller 144 can evaluate the most recent vehicle condition data stored in the memory 146 upon receiving a travel command or a stop command given by the travel control function 124 or the I/O function 126 on the remote control device 122. In one non-limiting example, only the most recent vehicle condition data can be stored in the memory 146. For example, one data point can be stored and then continuously updated (e.g., overwritten) in the memory 146 as the continuous evaluation loop 200 is executed by the travel request controller 144. In another non-limiting example, a history of the vehicle condition data can be stored in the memory 146.

Figure 5:
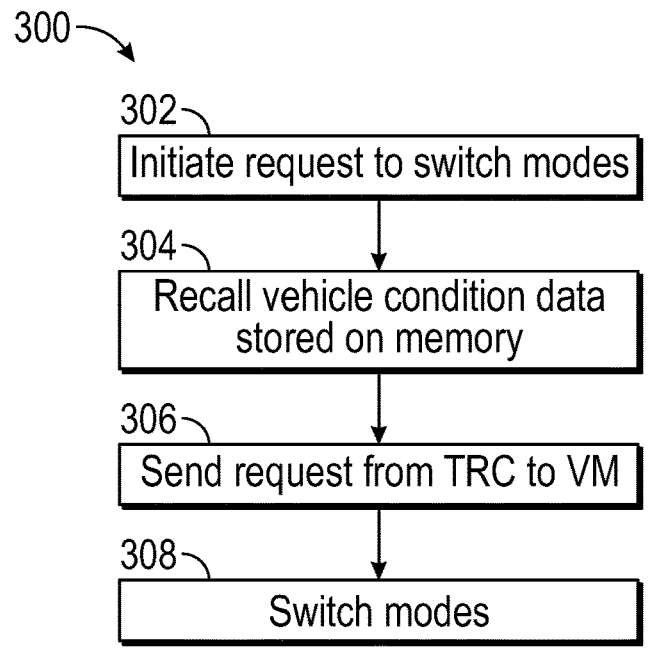
FIG. 5 is a schematic illustration of a method of switching a mode of operation of the material handling vehicle.

Referring now to FIG. 5, a method 300 of switching the material handling vehicle 100 from the manual mode to the travel request mode will be described. The process may start at step 302, where a request to transition from the manual mode to the travel request mode may be initiated (e.g., via one of the methods previously described herein). At step 304, the travel request controller 144 may then recall at least one of the most recent vehicle condition data stored on the memory 146 (e.g., the vehicle condition data that was updated on the previous continuous evaluation loop 200 execution) and determine if the stored vehicle conditions are appropriate for transitioning from the manual mode to the travel request mode. In that way, the travel request controller 144 can use vehicle condition data and motion condition information that has been previously updated to determine if vehicle conditions are appropriate for transitioning modes. For example, the travel request controller 144 can ensure that the most recent motion condition stored in the memory 146 is "STOPPED." In addition, in some non-limiting examples, the travel request controller 144 can also check other aspects of the material handling vehicle 100 at step 304. For example, the travel request controller 144 can query the vehicle manager 134 to ensure that the material handling vehicle 100 is being operated in a manual mode. The travel request controller 144 can also check to ensure the I/O function 126 on the remote control device 122 is not currently being actuated by an operator. If the travel request controller 144 determines that the vehicle conditions are not appropriate for transitioning from the manual mode to the travel request mode, the travel request controller takes no action and continues to evaluate the vehicle conditions (e.g., by executing the continuous evaluation loop 200).

Upon the travel request controller 144 determining that the vehicle conditions are appropriate based on the previously stored vehicle condition data, the travel request controller 144 may then send a signal to the vehicle manager 134 to request a transition from the manual mode to the travel request mode at step 306. In response to the signal sent from the travel request controller 144 to the vehicle manager 134, the vehicle manager 134 can then enable the material handling vehicle to switch to the travel request mode at step 308. With the material handling vehicle 100 in the travel request mode, remote operation of the material handling vehicle 100 by the operator using the remote control device 122 is then enabled. For example, the operator can use the remote control device 122 to send signals to the travel request controller 144, as previously described herein. The travel request controller 144 can then generate vehicle commands and then communicate those vehicle commands to the vehicle manager 134 for execution.

The material handling vehicle 100 can be switched back to the manual mode from the travel request mode by the operator (e.g., by actuating the switch 151, see FIG. 1). According to one non-limiting example, the material handling vehicle can be switched back to the manual mode from the travel request mode by the vehicle manager 134, if the vehicle manager 134 detects vehicle conditions that result in switching back to the manual mode.

Figure 6:
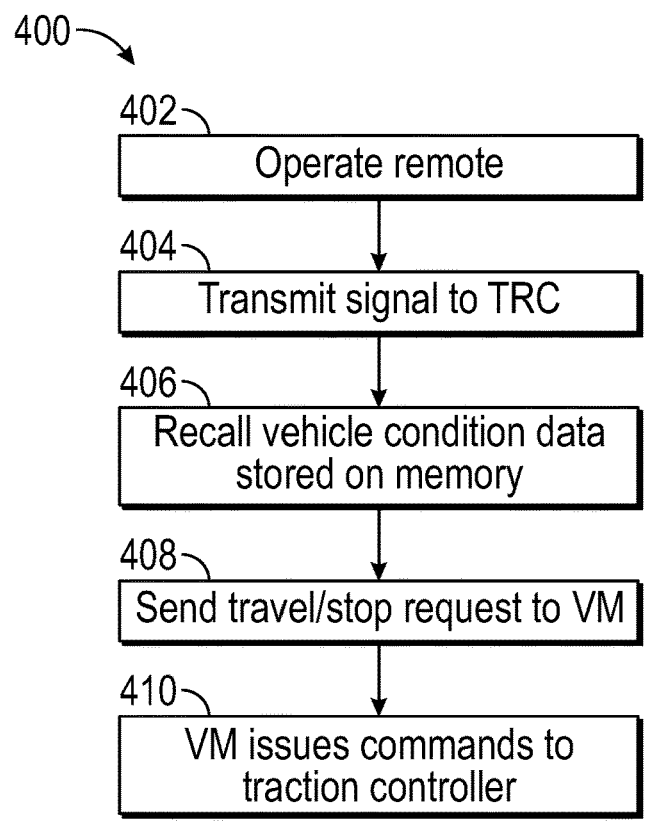
FIG. 6 is a schematic illustration of a method of operation of the material handling vehicle in a travel request mode.

Referring now to FIGS. 3 and 6, a method 400 of remotely operating the material handling vehicle 100 using the remote control device 122 when the material handling vehicle 100 is in a travel request mode is illustrated. In the exemplary discussion to follow, the example of an order picking operation will be described, where an operator of the material handling vehicle 100 may desire to move in an aisle and along a rack within a warehouse from one picking location to the next picking location. One of ordinary skill in the art readily recognizes that this is just one example of operation and is not intended to be limiting in any way.

The method 400 may begin at step 402, where the operator can actuate one of the travel control function 124 or the I/O function 126 on the remote control device 122, thus generating a first signal or a second signal, respectively. At step 404, the transmitter 128 may wirelessly communicate the first and/or second signal to the travel request controller 144 via the receiver 130 in communication with the transmitter 128.

If the operator actuates the travel control function 124, the travel request controller 144 may then recall at least one of the most recent vehicle condition data stored on the memory 146 (e.g., the vehicle condition data that was updated on the previous/most recent continuous evaluation loop 200 execution) at step 406 and determine if the stored vehicle conditions are appropriate for executing the travel request issued by the remote control device 122. For example, the travel request controller 144 can ensure that the most recent motion condition stored in the memory 146 is "STOPPED." In that way, the travel request controller 144 uses vehicle condition data and motion condition information that has been previously updated when determining if vehicle conditions are appropriate for the travel/stop command.

At step 408, upon determining that the vehicle conditions are appropriate based on the previously stored vehicle condition data, the travel request controller 144 may then send a request (e.g., a vehicle command) to the vehicle manager 134 based on the received signal at step 404. For example, if the operator actuates the travel control function 124 on the remote control device 122 (e.g., by depressing the first button 125 on the remote control device 122, see FIG. 7), the travel request controller 144 can send a travel command to the vehicle manager 134 to instruct the material handling vehicle 100 to move, or otherwise travel forward. According to another example, if the operator actuates the I/O function 126 on the remote control device 122, an unpair command is sent to the travel request controller 144 to request that the material handling vehicle 100 be unpaired from the remote control device 122 and a stop command can be sent from the travel request controller 144 to the vehicle manager 134 to instruct the material handling vehicle 100 to come to a stop.

In response to the received commands, the vehicle manager 134 can communicate to the traction controller 138 at step 410 to operate the power unit 142 to enable the material handling vehicle 100 to travel or stop (e.g., if a travel command or a stop command is received, respectively). For example, the material handling vehicle 100 may be at a first picking location within an aisle of a warehouse and the operator may desire the material handling vehicle 100 to travel to a second picking location within that aisle. The travel command executed by the vehicle manager 134 can enable the material handling vehicle to travel forward from the first picking location to the second picking location.

While the material handling vehicle 100 is traveling, the travel request controller may monitor the sensor 150 to determine if the material handling vehicle 100 should steer or stop. In the case that the sensor 150 provides an indication that the material handling vehicle 100 should steer, the travel request controller 144 can send a steer command to the vehicle manager 134 to request a steering maneuver. In response to the received steering command, the vehicle manager 134 can communicate to the steer control system 136 to maneuver the material handling vehicle 100 (e.g., to steer the material handling vehicle 100 to travel alongside a rack structure). In the case that the sensor 150 provides an indication that the material handling vehicle 100 should stop, for example, in response to detecting an obstacle in a travel path of the material handling vehicle 100, the travel request controller can send a stop command to the vehicle manager 134 to request that the material handling vehicle 100 come to a stop. In response to the received stop command, the vehicle manager 134 can communicate to the traction controller 138 to stop the material handling vehicle 100 (e.g., to stop the material handling vehicle 100 if the sensor 150 detects an obstacle in a travel path of the material handling vehicle 100).

For certain types of vehicles there are training requirements imposed by various government agencies, laws, rules and regulations. For example, the United States Department of Labor Occupational Safety and Health Administration (OSHA) imposes a duty on employers to train and supervise operators of various types of material handling vehicles. Recertification every three years is also required. In certain instances, refresher training in relevant topics shall be provided to the operator when required. In all instances, the operator remains in control of the material handling vehicle during performance of any actions. Further, a warehouse manager remains in control of the fleet of material handling vehicles within the warehouse environment. The training of operators and supervision to be provided by warehouse managers requires among other things proper operational practices including among other things that an operator remain in control of the material handling vehicle, pay attention to the operating environment, and always look in the direction of travel.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

I claim:

1. A material handling vehicle, comprising:
a controller comprising memory and processing circuitry, the processing circuitry configured to:
receive vehicle condition data from components of the material handling vehicle, the vehicle condition data indicative of a speed of the material handling vehicle and a steering angle of the material handling vehicle;
store the vehicle condition data in the memory;
execute a continuous evaluation loop to continuously update the vehicle condition data stored in the memory at predetermined discrete time intervals that are between 20 milliseconds and 1 second;
receive a travel request signal from a remote control device based on an input provided by an operator to the remote control device, the travel request signal commanding the material handling vehicle to move from a first location to a second location;
recall the vehicle condition data stored in the memory to determine a current vehicle condition for the material handling vehicle;
evaluate the travel request signal relative to the current vehicle condition to determine that the current vehicle condition is for commanding the material handling vehicle to move from the first location to the second location; and
responsive to determining that the current vehicle condition is for commanding the material handling vehicle to move from the first location to the second location, command at least one of the components of the material handling vehicle to operate the material handling vehicle in accordance with the travel request signal.

2. The material handling vehicle of claim 1, wherein:
in the first mode, the material handling vehicle does not operate in accordance with travel request signals received from the remote control device; and
in the second mode, the material handling vehicle does operate in accordance with travel request signals received from the remote control device.

3. The material handling vehicle of claim 1, wherein the processing circuitry is configured to determine the current vehicle condition by comparing the speed of the material handling vehicle to a threshold value.

4. The material handling vehicle of claim 3, wherein the current vehicle condition indicates that the material handling vehicle is stopped or that the material handling vehicle is in motion.

5. The material handling vehicle of claim 1, wherein, responsive to determining that the current vehicle condition is for commanding the material handling vehicle to move from the first location to the second location, the processing circuitry is configured to transition the material handling vehicle from a first mode to a second mode.

6. The material handling vehicle of claim 1, further comprising an obstacle detection sensor, wherein the processing circuitry is configured to receive the vehicle condition data from the obstacle detection sensor, and the vehicle condition data is further indicative of a presence of an obstacle in or near a travel path of the material handling vehicle.

7. A system for remotely operating a material handling vehicle, comprising:
a material handling vehicle controller on the material handling vehicle, the material handling vehicle controller comprising processing circuitry and memory; and
a remote control device in communication with the material handling vehicle controller, the remote control device comprising a transmitter that sends a travel request signal to the material handling vehicle based on an input provided by an operator to the remote control device;
wherein the processing circuitry of the material handling vehicle controller is configured to:
receive vehicle condition data from components of the material handling vehicle, the vehicle condition data indicative of a speed of the material handling vehicle and a steering angle of the material handling vehicle;
store the vehicle condition data in the memory;
execute a continuous evaluation loop to continuously update the vehicle condition data stored in the memory at predetermined discrete time intervals that are between 20 milliseconds and 1 second;
receive the travel request signal from the remote control device based on the input provided by the operator to the remote control device, wherein the travel request signal commands the material handling vehicle to move from a first location to a second location;
recall the vehicle condition data stored in the memory to determine a current vehicle condition for the material handling vehicle;
evaluate the travel request signal relative to the current vehicle condition to determine that the current vehicle condition is for commanding the material handling vehicle to move from the first location to the second location; and
responsive to determining that the current vehicle condition is for commanding the material handling vehicle to move from the first location to the second location, command at least one of the components of the material handling vehicle to operate the material handling vehicle in accordance with the travel request signal.

8. The system of claim 7, wherein the processing circuitry of the material handling vehicle controller is configured to determine the current vehicle condition by comparing the speed of the material handling vehicle to a threshold value.

9. The system of claim 8, wherein the current vehicle condition indicates that the material handling vehicle is stopped or that the material handling vehicle is in motion.

10. The system of claim 7, wherein the vehicle condition data is further indicative of a presence of an obstacle in or near a travel path of the material handling vehicle.

11. The system of claim 7, wherein the transmitter wirelessly sends the travel request signal to the material handling vehicle controller.

12. The system of claim 7, wherein responsive to determining that the current vehicle condition is for commanding the material handling vehicle to move from the first location to the second location, the processing circuitry of the material handling vehicle controller is configured to transition the material handling vehicle from a first mode to a second mode.

13. The system of claim 12, wherein:
in the first mode, the material handling vehicle does not operate in accordance with travel request signals received from the remote control device; and
in the second mode, the material handling vehicle does operate in accordance with travel request signals received from the remote control device.

14. The system of claim 7, wherein the remote control device comprises:
a first physical button selectable by the operator to send the travel request signal to the material handling vehicle controller; and
a second physical button that is selectable by the operator to pair the remote control device from the material handling vehicle controller.

15. A method for remotely operating a material handling vehicle, comprising:
receiving vehicle condition data from components of the material handling vehicle, the vehicle condition data indicative of a speed of the material handling vehicle and a steering angle of the material handling vehicle;
storing the vehicle condition data in memory;
executing a continuous evaluation loop to continuously update the vehicle condition data stored in the memory at predetermined discrete time intervals, wherein the predetermined discrete time intervals are between 20 milliseconds and 1 second;
receiving a travel request signal from a remote control device based on an input provided by an operator to the remote control device, the travel request signal commanding the material handling vehicle to move from a first location to a second location;
recalling the vehicle condition data stored in the memory to determine a current vehicle condition for the material handling vehicle;
evaluating the travel request signal relative to the current vehicle condition to determine that the current vehicle condition is for commanding the material handling vehicle to move from the first location to the second location; and
responsive to determining that the current vehicle condition is for commanding the material handling vehicle to move from the first location to the second location, commanding at least one of the components of the material handling vehicle to operate the material handling vehicle in accordance with the travel request signal.

16. The method of claim 15, wherein determining the current vehicle condition comprises comparing the speed of the material handling vehicle to a threshold value.

17. The method of claim 16, wherein the current vehicle condition indicates that the material handling vehicle is stopped or that the material handling vehicle is in motion.

18. The method of claim 15, further comprising, responsive to determining that the current vehicle condition is for commanding the material handling vehicle to move from the first location to the second location, transitioning the material handling vehicle from a first mode to a second mode.

19. The method of claim 18, wherein:
in the first mode, the material handling vehicle does not operate in accordance with travel request signals received from the remote control device; and
in the second mode, the material handling vehicle does operate in accordance with travel request signals received from the remote control device.

20. The method of claim 15, wherein the vehicle condition data is further indicative of a presence of an obstacle in or near a travel path of the material handling vehicle.

\* \* \* \* \*